United States Patent [19]
Schriefer

[11] Patent Number: 5,957,762
[45] Date of Patent: Sep. 28, 1999

[54] INTERNALLY TOOTHED TOOL FOR THE PRECISION MACHINING OF GEAR WHEELS

[75] Inventor: Herbert Schriefer, Gauting, Germany

[73] Assignee: The Gleason Works, Rochester, N.Y.

[21] Appl. No.: 08/852,847

[22] Filed: May 7, 1997

Related U.S. Application Data

[62] Division of application No. 08/299,563, Sep. 1, 1994, Pat. No. 5,645,467.

[51] Int. Cl.$^6$ ........................................... B23F 19/06
[52] U.S. Cl. ........................... 451/147; 451/219; 451/253; 451/900
[58] Field of Search .............................. 451/47, 147, 161, 451/219, 253, 258, 275, 900

[56] References Cited

U.S. PATENT DOCUMENTS

| | | |
|---|---|---|
| 3,720,989 | 3/1973 | Ramond . |
| 4,047,449 | 9/1977 | Popov . |
| 5,092,720 | 3/1992 | Abysov et al. . |
| 5,368,455 | 11/1994 | Eisenmann . |
| 5,395,189 | 3/1995 | Schriefer . |
| 5,443,338 | 8/1995 | Huber et al. . |

Primary Examiner—Eileen P. Morgan
Attorney, Agent, or Firm—Robert L. McDowell

[57] ABSTRACT

A method for the precision machining of flanks of gear-wheel-shaped workpieces, in particular those with convex teeth, using an internally toothed tool with crossed axes, in which simultaneous relative movements take place not only in three mutually perpendicular axes but also around an axis perpendicular to the cross-axes angle such that not only the tooth flanks of the tool and the workpiece have tangential contact with one another but also the base body of the tool and of the workpiece touch one another at a point of contact IV of which the position changes continuously, and a straight line g orthogonally penetrating the base body of the tool and the base body of the workpiece at the point of contact not only intersects the axis $C_1$ of the workpiece or of its base body and the axis $C_2$ of the tool or its base body (points III, II), but also passes through the center I of an ideal sphere $K_1$ which adapts itself to the base body of the workpiece at the point of contact IV. If a tool with convex teeth is used, the straight line g should also pass through the center V of an ideal sphere K2 which adapts to the base body of the tool at the point of contact IV. In addition, tools suitable for this method are proposed and possible ways of appropriately dressing them.

8 Claims, 7 Drawing Sheets

INTERNALLY TOOTHED TOOL FOR THE PRECISION MACHINING OF GEAR WHEELS

This is a divisional of application Ser. No. 08/299,563 filed Sep. 1, 1994, now U.S. Pat. No. 5,645,467.

FIELD OF THE INVENTION

The invention relates to a method and an internally toothed tool for the precision machining of gear-wheels, and a method and dressing wheel for dressing the tool.

BACKGROUND OF THE INVENTION

The invention is based on a method of machining gear wheels, of which the principle is described in U.S. Pat. No. 5,395,189 to Schriefer which may be carried out using an internally toothed tool on a machine as described in U.S. Pat. No. 5,443,338 to Huber et al. It has been found in practice that the machining of corrected teeth with an externally toothed tool with simultaneous movements in three mutually perpendicular axes on a machine without a cradle or the like does not give rise to problems in the case of small widthwise corrections (for example, convexity) whereas machining with an internally toothed tool often produces unsatisfactory results.

The reason is that in the case of an externally toothed workpiece wheel and tool, two convex base bodies perform relative movements. However, in the case of an externally toothed workpiece wheel and an internally toothed tool, a convex and a concave base body are in contact. Therefore, the contact intervals are substantially smaller outside the contact zone and there is a risk of miscutting by secondary cuts or edge contact even with small widthwise corrections during a relative movement between workpiece wheel and tool. Furthermore, the smaller contact intervals lead to increased sensitivity with respect to the position and size of the contact zone. This in turn influences the clockwise and counterclockwise equilibrium of the contact forces and therefore the local instantaneous flank removal which decisively determines the flank quality attainable.

Therefore, mutually orthogonal spatial movements of the contacting base bodies of workpiece wheel and tool are often inadequate, in particular in the case of internally toothed tools.

SUMMARY OF THE INVENTION

Accordingly, it is an object of the invention to improve the method of the type under discussion such that satisfactory results can also be achieved with internally toothed tools. In addition, the tools are to be developed such that they can be used as widely as possible, in particular for preliminary and final honing. Furthermore, it should be possible to adjust the tool according to the machining of the workpieces.

In the contact zone, there is a rotational degree of freedom round the contact normal which is simultaneously appropriately included in the orthogonal three-axis interpolation.

The simultaneous interpolation of (i.e. simultaneous movements along) the three orthogonal axes together with an interpolation of the change in the crossed-axes angle represents the minimum kinematics required. In the case of the movements which can be carried out in shaving and honing machines known to date, more degrees of freedom are provided (e.g. the tilting of the rocker) than is the case here, so that more machine axes have to be controlled therein (which is costly and therefore unwanted).

The method covers two mutually independent kinematic effects. The simultaneous relative displacement of the workpiece wheel relative to the tool in the directions of three orthogonal axes allows substantially free design of the shape of the workpiece wheel and tool base bodies and therefore of flank width corrections (convex, conical, hollow, conical-convex, hollow-convex) and of the instantaneous relative position of the machining zones both on the workpiece wheel and on the tool flanks. Advantageous feed strategies axially, diagonally, transversely or radially to the workpiece wheel axis can be made in succession or merging into one another in this way. The simultaneous rotation round the axis of the crossed-axes angle allows each instantaneous relative contact position of the bodies of the tooth gaps and of the teeth of workpiece wheel and tool to rotate relatively such that no secondary cuts occur and defined contact conditions arise. According to the invention the kinematically acting base body of the tool may be cylindrical, i.e. only convex workpiece wheel flanks of which the kinematically acting base body has identical or greater kinematic convexity than the cylindrical base body of the tool may be produced with this base body.

In this specification "kinematic" and related terms refer to the effective form of a body generated by the combination of its spatial movements and its physical shape.

Alternatively, the tool of the present invention may have a convex base body. Convex, straight and hollow-convex workpiece wheel flanks can therefore be produced, and the size of the contact zone between workpiece wheel and tool flanks may be intentionally influenced.

The present invention also resides in an internally toothed tool, suitable for use in the method set out above, of which the teeth have width corrections which act kinematically differently in the width direction.

Preferably, the tool has a region with a large kinematically acting width correction for preliminary honing, and a region for subsequent final honing, with no or only a small kinematically acting width correction.

The present invention further contemplates operating with one or more tools in a chuck, the tools having different kinematically acting width corrections. It may be advantageous, for example, to carry out preliminary honing with a cutting-friendly tool with a small contact zone in order to reduce the processing forces and final honing with which the flanks are only smoothed with a large contact zone.

Both preliminary and final honing may be performed with double-flank contact, or the preliminary honing may be performed with single-flank contact, single flank contact being preferably carried out with electronic constraint in this case.

The tool may mesh with the workpiece in a free-running manner during both preliminary honing and final honing. Alternatively, the tool and workpiece may run under constraint during preliminary honing, but mesh in free-running manner during subsequent final honing.

The use of constrained single-flanked contact in the method according to the present invention allows substantially independent free design of the workpiece wheel right-hand and left-hand flank width corrections. The subsequent free-running double-flank contact is brought about by relative displacements of the base bodies and serves only for flank smoothing.

The tool may have two or more axially adjacent identical sets of teeth, which are moved by displacement along the X and/or Y and/or Z axis into the operating position, lying where the axes cross, or away from the crossing position. Alternatively the tool may have two or more axially adjacent different sets of teeth.

In the ideal case, it is possible to displace the individual cylindrically arranged teeth with the X and Z axes of the machine into the intersection or crossing of axes in each case and to increase the internal diameter of the tool by profile displacement to the respective end of the tool life. This is conditional on neither the workpiece wheel itself nor the clamping device colliding with the further teeth located in the axial direction of the tool as these teeth would have to be arranged not on a cylindrical but on a hyperbolic base body for reasons of collision. However, the present method also allows the base bodies both of the workpiece wheel and of the tool to be conical or conical-convex. It is therefore possible to machine the workpiece wheel in another state of the tool tilted by the X-Y-Z-displacement and A-rotation and therefore to bring the still unused further tool teeth from the collision region.

If a shaft-like workpiece or cluster gear with different teeth is machined in a chuck with several different adjacent tool teeth, machining can also be carried out with adjacent teeth in the tilted tool state to avoid collisions.

The internally toothed tool can basically be dressed with an appropriate dressing tool in the same manner as the machining of a workpiece wheel with the internally toothed tool. It is particularly advantageous if different tooth widths can be produced for the preliminary and the final honing region for machining with single- and double-flank contact.

Accordingly, the invention also resides in a method of dressing an internally toothed tool with a toothed dressing wheel of which the teeth data correspond to those of the workpiece to be machined with the internally toothed tool and of which the tooth flanks are covered with extremely hard abrasive granules, in which with the tool and dressing wheel axes crossing at a crossed-axes angle, the tool meshes with the dressing wheel and is moved relative to it, simultaneous relative movements taking place in three mutually perpendicular axes and additionally a pivoting movement about the axis perpendicular to the crossed-axes angle whereby the crossed-axes angle varies, such that not only the tooth flanks of tool and dressing wheel have tangential contact with one another but also the base bodies of the tool and of the dressing wheel, which touch one another at a contact point of which the position changes continuously, continuously have tangential contact with one another, and a straight line orthogonally penetrating the base body of the tool and the base body of the dressing wheel at the respective point of contact not only intersects the axis of the dressing wheel or of its base body and the axis of the tool or of its base body, but also passes through the center of an ideal envelope sphere which is adapted to the base body of the dressing wheel at the said point of contact.

Preferably, for a tool of which the teeth have a preliminary honing region and a final honing region, the preliminary honing region and the final honing region are dressed with single-flank contact between dressing wheel and internally toothed tool and with constraint.

The dressing wheel preferably has an end bevel, preferably of at least 45°, which serves to separate the tangentially issuing free floats for workpiece wheel machining over a wide continuous tool region with different kinematically acting width corrections. The end bevel preferably extends over the entire dressing wheel tooth height, and is covered with very hard abrasive granules.

The invention allows a number of variations which fall within the wording of the claims and are also to fall within the scope of protection. Soft shaving and hard shaving also fall within the scope of protection.

With regard to the definition of the various terms used here such as honing, soft shaving, hard shaving, base body, etc., reference is made to "H. Schriefer: Zahnflanken-Feinbearbeitung fur die Grossserienfertigung" in the German journal "Werkstatt und Betrieb 126 (1993) 7, pages 411–415".

BRIEF DESCRIPTION OF THE DRAWINGS

The invention is described hereinafter with reference to embodiments which are illustrated in the drawings, in which.

DETAILED DESCRIPTION

Figure 1:
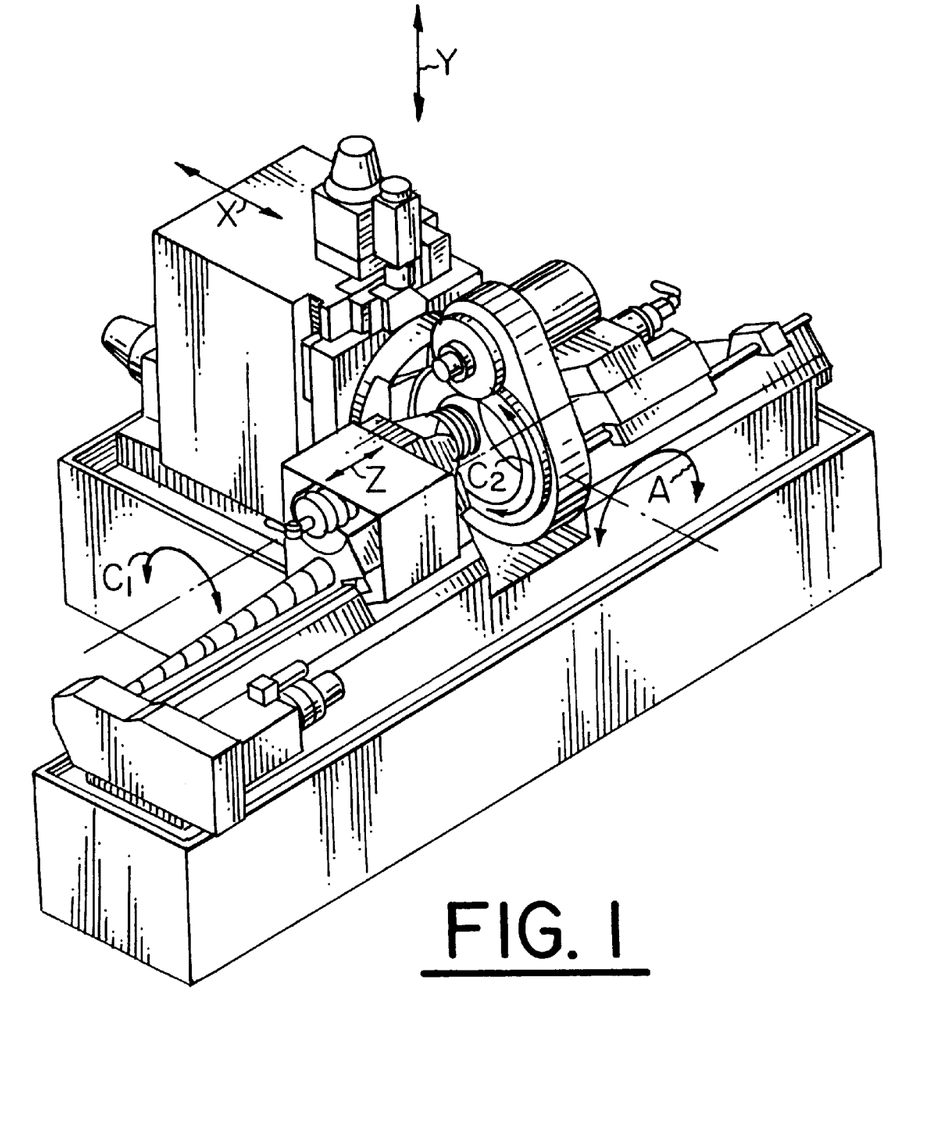
FIG. 1 shows the construction of a machine on which the methods according to the invention may be carried out and the tool according to the invention may be used, in a perspective view.

FIG. 1 shows a gear-finishing machine, using which the present invention can be applied. The machine itself is of substantially conventional construction in most respects, except that it provides for the rocking motion of the tool during machining. The three orthogonally superimposed machine axes X, Y and Z, as well as the pivot axis A which is simultaneously interpolated with the X-, Y-, Z-axes and about which the crossed-axes angle of tool $T_2$ and workpiece $T_1$ is adjusted, can be seen. The axis $C_1$ is the axis of rotation of the workpiece wheel and the axis $C_2$ is the axis of rotation of the internally toothed tool. These two axes may be free-running or may be constrained by means of an electronic system.

Figure 2:
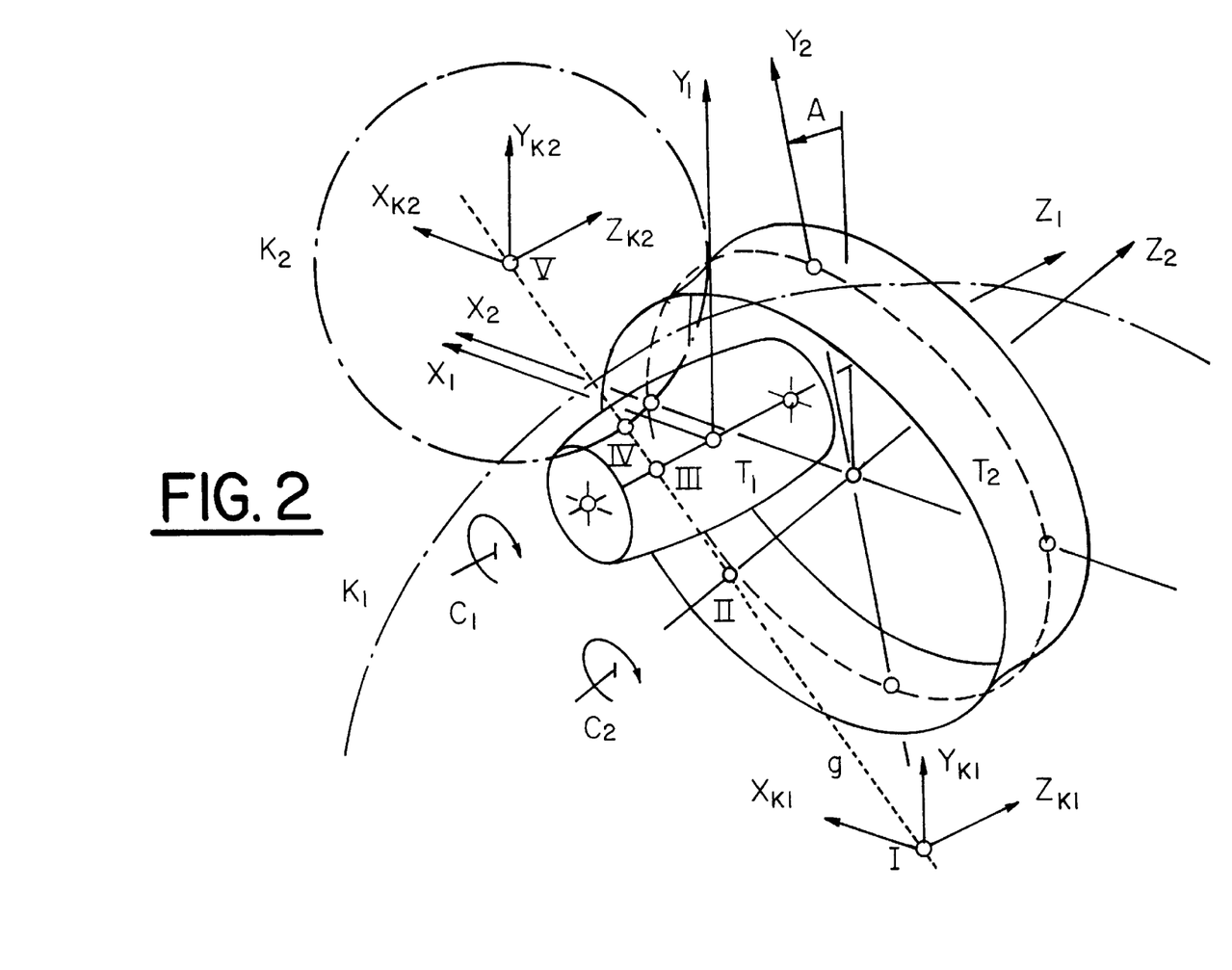
FIG. 2 is a three dimensional perspective view showing the base bodies of the workpiece and tool, very schematically.

FIG. 2 is a three dimensional view of the base bodies of workpiece wheel $T_1$ and tool $T_2$ as well as their respective enveloping spheres $K_1$ and $K_2$, allocated to the instantaneous contact point IV, of the contact line passing through the contact point IV. The co-ordinate system $X_1$-$Y_1$-$Z_1$ is allocated to the workpiece wheel in an axially oriented manner and the co-ordinate system $X_2$-$Y_2$-$Z_2$ is allocated to the tool in an axially orientated manner.

$Z_1$ is the axis of rotation of the workpiece. $X_1$ and $Y_1$ have their origin at the center of the width of the workpiece. The co-ordinate system for the tool is defined analogously. In operation the axis of rotation of the workpiece is stationary and the workpiece does not move other than to rotate about its axis. The tool feed axis is the axis $X_2$, which is parallel to the axis $X_1$ of the workpiece. The workpiece axes are parallel to the previously mentioned axes of the machine.

The tool can rock or pivot about its axis $X_2$, so that a crossed-axes angle A can exist between the Y axis and axis of rotation of the tool, and the Y axis and axis of rotation of the workpiece.

Associated with the workpiece and tool are respective ideal envelope spheres $K_1$ and $K_2$. The radii of curvature of these spheres correspond to the radii of curvature of the workpiece or the tool at the point of contact, so that the centers of the spheres are correspondingly also determined. In FIG. 2, at the point of contact IV, the workpiece envelope $K_1$ closely follows the crowned contour of the workpiece, and the tool envelope sphere closely follows the hollow crowned contour of the tool. Since the curvature may vary from point to point on the tool and workpiece, these ideal envelope spheres are not constant.

The co-ordinate system $X_{K1}$-$Y_{K1}$-$Z_{K1}$ describes the center of the enveloping sphere of the instantaneous workpiece wheel flank line correction and the coordinate system $X_{K2}$-$Y_{K2}$-$Z_{K2}$ describes the center of the enveloping sphere of the tool flank line correction. These coordinate axes are parallel to $X_1$-$Y_1$-$Z_1$. $C_1$ and $C_2$ are the workpiece wheel and tool rotations and A is the instantaneous rotational position of the tool round the axis of the angle of intersection of the axes $X_2$. The straight line g describes the instantaneous contact condition for the contact point IV between the base bodies and the enveloping spheres. For this purpose, the straight line g has to intersect the centers of the enveloping spheres at I and V and the workpiece wheel axis at III and the tool axis at II. If a contact point sequence enveloping the entire body in width direction $Z_1$ is required, for example, on the workpiece wheel base body $T_1$, the simultaneous rotation and displacement between $X_1$-$Y_1$-$Z_1$ and $X_2$-$Y_2$-$Z_2$ should be selected such that the straight line g satisfies the aforementioned conditions. At the same time, a contact point sequence can be predetermined on the tool base body $T_2$, the base body surface $T_1$ and $T_2$ and then being displaced relative to one another if the aforementioned contact conditions are observed.

The contact point sequences should obviously be predetermined so as to produce advantageous advances which are identified by a steady change in relative position between workpiece wheel and tool.

It can be seen, for example, that the centers of the enveloping spheres $K_1$ and $K_2$ can also lie in such a way that base body forms which are hollow in width, conical or conical-convex are produced. If the radii of the enveloping spheres tend to infinity, cylindrical base bodies are produced. With the known base body shapes, care should be taken with the aforementioned contact conditions to avoid the possibility of multiple contact possibilities. This would mean that the workpiece wheel flank is distorted by secondary cuts. Edge contacts which represent ambiguous solutions must also be avoided.

Figure 3:
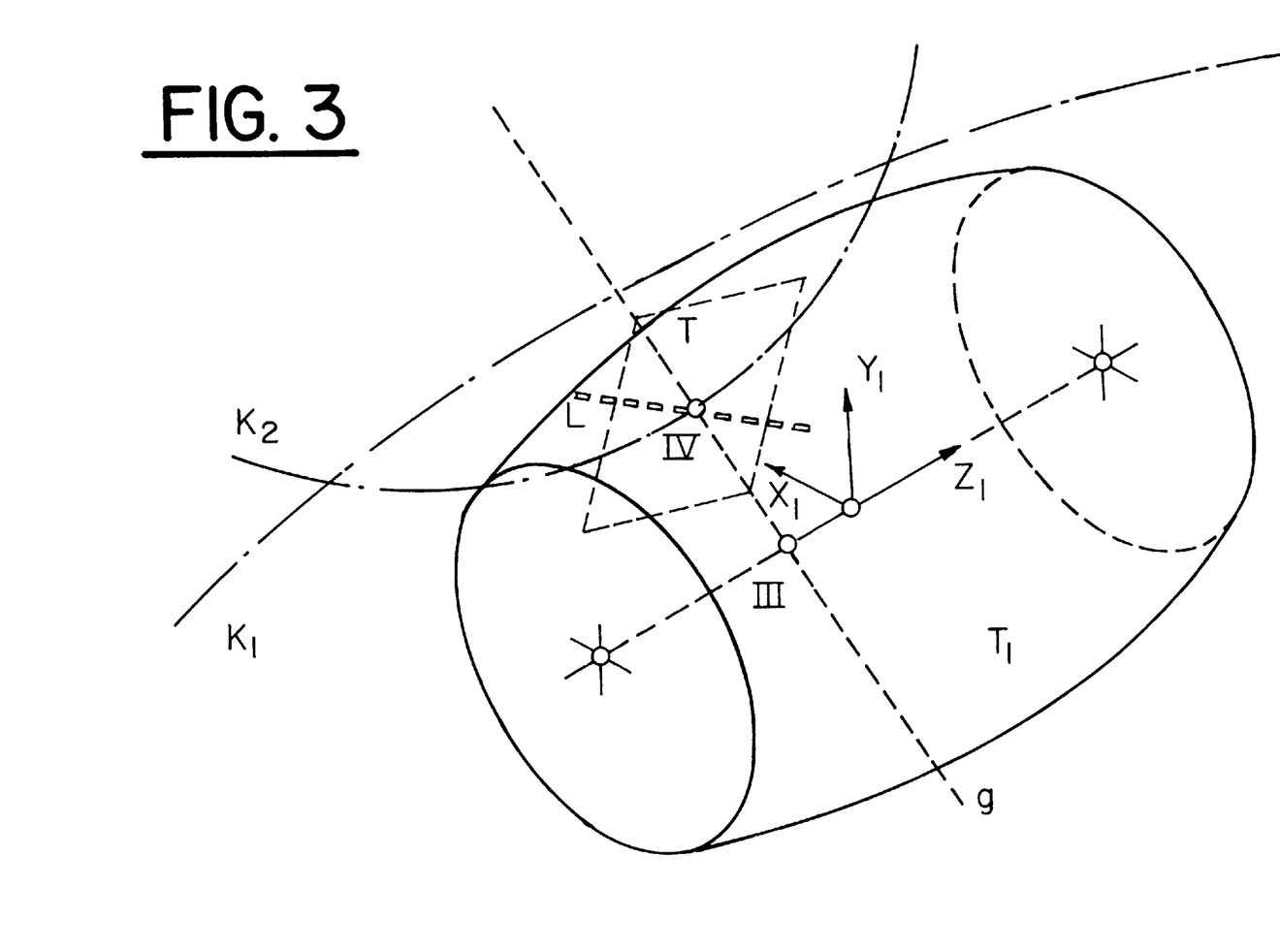
FIG. 3 schematically shows the base body of the workpiece on a larger scale, and conditions at the point of contact between tool and workpiece.

FIG. 3 shows the workpiece wheel base body $T_1$ as well as the conditions at contact point IV through which the straight line g extends.

The base bodies $T_1$, $T_2$ and the enveloping spheres $K_1$ and $K_2$ have tangential contact at contact point IV, a tangential plane T which is orthogonal to g illustrating this. It can be imagined that the individual base and enveloping bodies are rotatable round the straight line g without impairing the aforementioned contact condition. With an actual gearwheel, however, this rotation has a decisive influence on the contact behavior between workpiece wheel and tool flanks. Therefore, a line L lying in the plane T which describes the contact behavior of the flanks can be specified for each instantaneous contact position IV. The instantaneous rotational position of L providing proper contact conditions leads to the simultaneous rotation A as a result of appropriate geometric conversion.

Figure 4A:
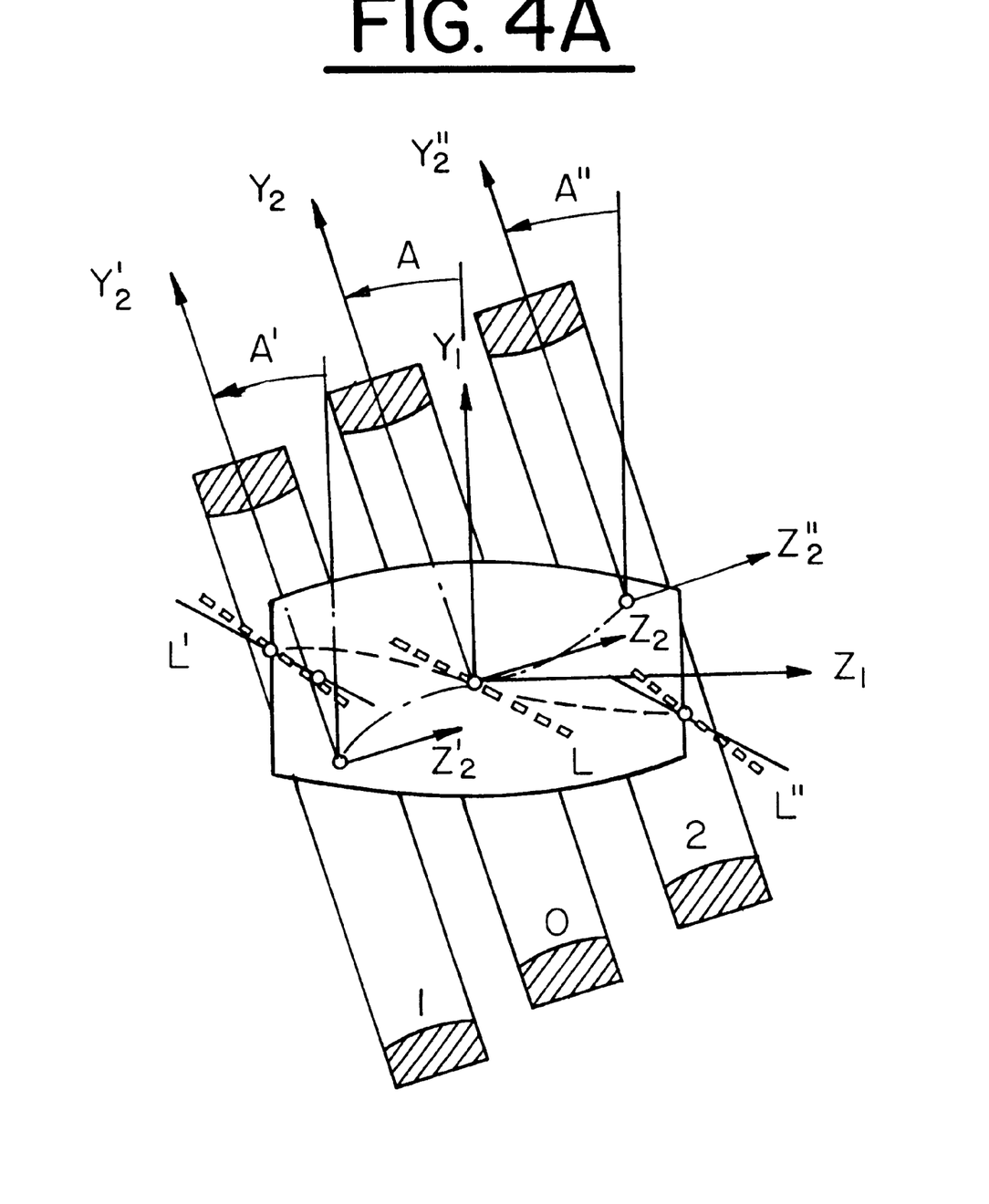
FIGS. 4a to 4c show front, plan and side views of the tool and workpiece base bodies in different relative positions during machining.
Figure 4B:
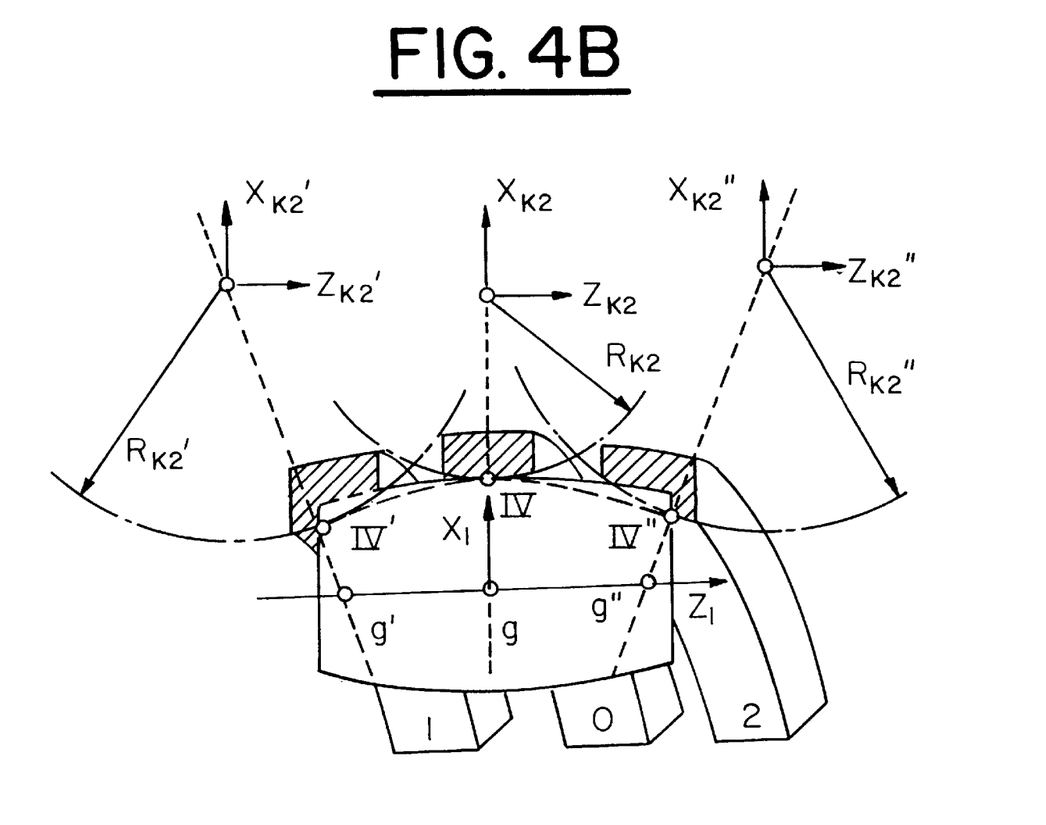
Figure 4C:
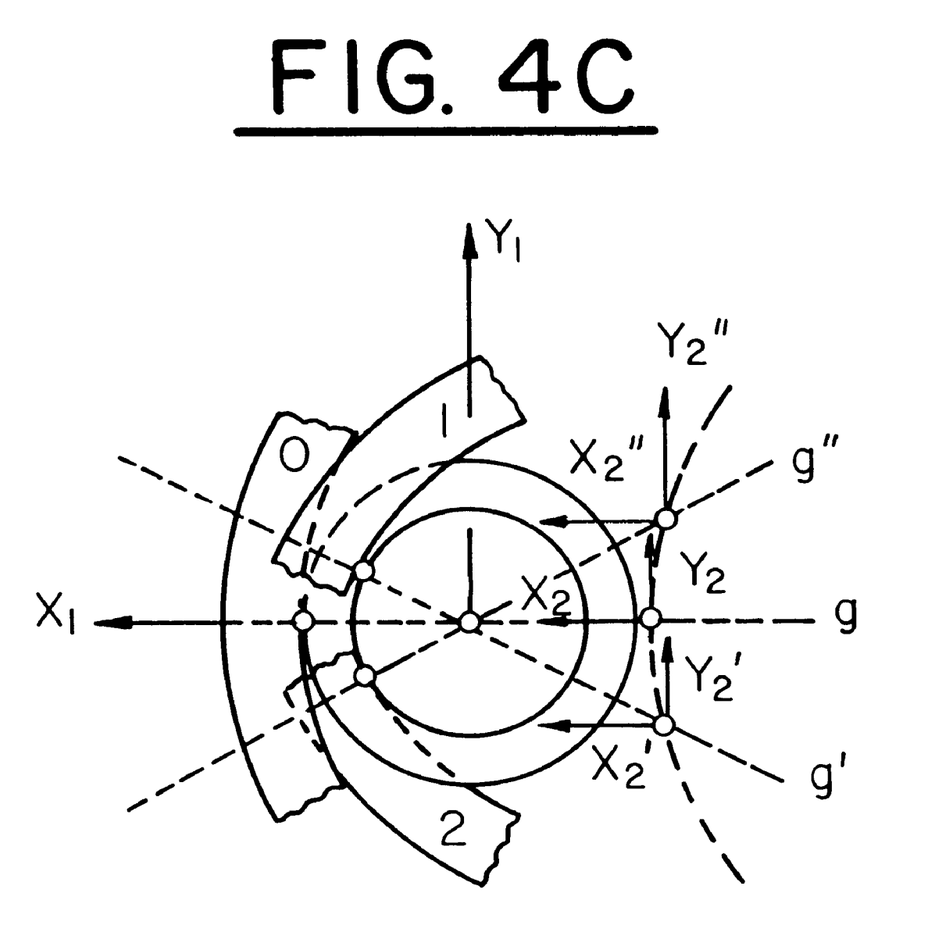

FIGS. 4a, 4b, 4c are schematic front, plan and side views of the base and enveloping body kinematics. The instantaneous contact positions 0, 1 and 2 dependent on the width of the workpiece wheel are shown. The contact point shifts from IV' to IV and then to IV" with the associated straight lines g', g and g". The movement of the tool relative to the workpiece takes place in accordance with the front view from $Y'_2$, $Z''_2$ via $Y_2$, $Z_2$, towards $Y''_2$, $Z''_2$. These three positions are designated 1, 2 and 3. The tool follows the path $(X_2$-$Y_2$-$Z_2)'$, $(X_2$-$Y_2$-$Z_2)$ to $(X_2$-$Y_2$-$Z_2)''$. The radii of the tool enveloping spheres change with $R'_{K2}$, $R_{K2}$ and $R''_{K2}$. The rotational position from L', L to L" is shown in the front view.

Figure 5:
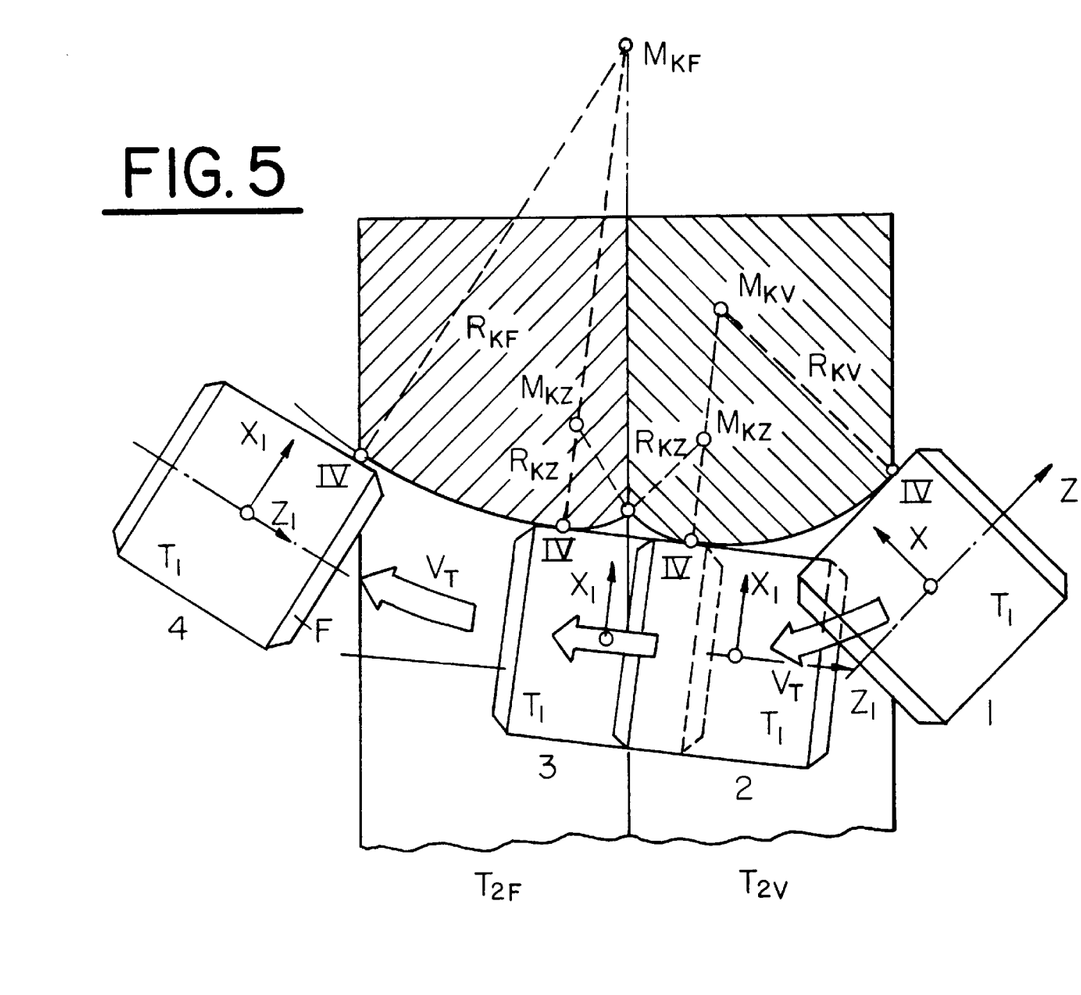
FIG. 5 shows the shape and movements of a workpiece or dressing wheel relative to the machining tool considered at stationary.

FIG. 5 illustrates a two-part tool T2, with axially adjacent different sections of toothing.

The elements marked T1 can be taken to correspond either to a workpiece to be machined, or a dressing wheel for dressing the tool.

The tool is shown as being stationary. In practice this is not the case, the relative movements of the tool and workpiece, of the tool and dressing wheel, are effected as already described with reference to FIGS. 1–4.

FIG. 5 shows a tool which has two base bodies $T_{2F}$ and $T_{2V}$. Different positions 1–4 of the base body of the workpiece or dressing wheel, relative to the tool, are shown. The contact conditions are shown greatly simplified and enlarged in a plane section.

The tool base body $T_{2V}$ has a smaller radius of convexity $R_{KV}$ generated kinematically as a consequence of the spatial relative movement of the tool. This first base body is used for preliminary honing of a workpiece. The axially adjacent base body $T_{2F}$ has a greater effective radius of $R_{KF}$ used for final honing of a workpiece.

These radii correspond to $R_{K2}$ in the preceding description. The centers of curvature of the respective base bodies are at $M_{KV}$ and $M_{KF}$, corresponding to the point V in FIG. 2.

In use, the workpiece is first honed with the tool base body $T_{2V}$, in the manner already described with reference to FIG. 4, thereafter, following axial relative movement, the workpiece is final-honed using the tool base body $T_{2F}$.

The curvatures of the base bodies of the tool shown in FIG. 5 are shown as portions of two arcs freely selected from empirical values. However this is not essential, other tool contours are possible and in an extreme theoretical case, the tool contour could be a straight line.

FIG. 5 illustrates more specifically the dressing of the tool by means of a dressing wheel shown at $T_1$, in successive relative positions 1–4.

The dressing wheel is provided with end bevels F at both ends, over the entire tooth height. During the dressing process, the dressing wheel base body is guided along the envelope sphere paths from $M_{KV}$ and $M_{KF}$, a tangential transition existing between the two enveloping spheres. Two intermediate envelope spheres $R_{KZ}$, $M_{KZ}$ which bring about facial free floating during the machining of the workpiece wheel can be located between the two enveloping spheres.

During dressing, this free floating is produced by means of the end bevel F, covered with hard abrasive material, of the dressing wheel, the cylindrical base bodies and the base bodies which are bevelled by the end bevel being brought continuously into contact with the intermediate envelope spheres. Uninterrupted dressing at the tangential speed $V_T$ from the right-hand face of the tool to the left is thus achieved. It is also possible to dress with a coarsely covered dressing wheel member for the preliminary honing tool region and to bring a finely covered dressing wheel member into contact for the final tool honing region as dressing wheel width-dependent contact progresses. During preliminary and final honing, the workpiece wheel moves continuously tangentially onto the tool base body from the preliminary honing into the final honing region. This ensures that the tooth flank contact is maintained during the transition from preliminary honing to final honing during free-running honing.

The embodiments of the invention in which an exclusive property or privilege is claimed are defined as follows:

1. An internally toothed tool for use in the precision machining of flanks of gear-wheel-shaped workpieces, said tool comprising:

a plurality of teeth, each of said plurality of teeth having a width, said teeth each having a plurality of regions along said width with one or more of said regions comprising a width correction, the one or more width corrections being kinematically different and providing for differing kinematic action between said tool and said workpiece along said width during said machining.

2. An internally toothed tool according to claim 1, wherein there is a tangential transition between the regions with kinematically different width correction.

3. An internally toothed tool according to claim 1, wherein its teeth have at least one region without or with only small kinematically acting width correction for a final honing process and at least one region with larger kinematically acting width correction for a preliminary honing process.

4. An internally toothed tool according to claim 3, wherein there is a tangential transition between the regions with kinematically different width correction.

5. An internally toothed tool according to claim 1, wherein the regions with kinematically differently acting width correction are separated from one another by a contact-free zone.

6. An internally toothed tool according to claim 1, wherein the regions with kinematically differently acting width correction have different cutting materials and/or different cutting geometry.

7. An internally toothed tool according to claim 1, wherein said tool is composed of at least two parts each having teeth which differ from one another in their kinematically acting width correction.

8. An internally toothed tool according to claim 1, wherein said tool has two or more axially adjacent identical sets of teeth.

* * * * *